(12) United States Patent
Oostveen et al.

(10) Patent No.: US 10,779,338 B2
(45) Date of Patent: Sep. 15, 2020

(54) METHOD, TELECOMMUNICATIONS NODE AND TELECOMMUNICATIONS TERMINAL

(71) Applicants: Koninklijke KPN N.V., The Hague (NL); Nederlandse Organisatie voor Toegepast-Natuurwetenschappelijk Onderzoek TNO, 's-Gravenhage (NL)

(72) Inventors: Job Cornelis Oostveen, Haren (NL); Antonius Norp, The Hague (NL); Michael Schenk, The Hague (NL); Ljupco Jorguseski, Rijswijk (NL); Robertus Smets, Utrecht (NL)

(73) Assignees: KONINKLIJKE KPN N. V., Rotterdam (NL); NEDERLANDSE ORGANISATIE VOOR TOEGEPAST-NATUURWETENSCHAPPELLIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 14/651,545

(22) PCT Filed: Dec. 16, 2013

(86) PCT No.: PCT/EP2013/076644
§ 371 (c)(1),
(2) Date: Jun. 11, 2015

(87) PCT Pub. No.: WO2014/095680
PCT Pub. Date: Jun. 26, 2014

(65) Prior Publication Data
US 2015/0327306 A1    Nov. 12, 2015

(30) Foreign Application Priority Data

Dec. 17, 2012 (EP) .................................. 12197439

(51) Int. Cl.
*H04W 76/11* (2018.01)
*H04W 24/02* (2009.01)
(Continued)

(52) U.S. Cl.
CPC .............. *H04W 76/11* (2018.02); *H04W 8/30* (2013.01); *H04W 24/02* (2013.01); *H04W 24/04* (2013.01)

(58) Field of Classification Search
CPC ... H04W 24/02; H04W 24/04; H04W 76/021; H04W 8/30; H04W 76/11
(Continued)

(56) References Cited

U.S. PATENT DOCUMENTS

2007/0123211 A1    5/2007 Lui et al.
2011/0032816 A1*   2/2011 Isaksson ............. H04W 76/028
                                              370/225
(Continued)

FOREIGN PATENT DOCUMENTS

EP    1571860 A1    9/2005
EP    1914937 A1    4/2008

OTHER PUBLICATIONS

"3rd Generation Partnership Project: Technical Specification Group Core Network and Terminals; Non-Access-Stratum (NAS) Protocol for Evolved Packet System (EPS); Stage 3 (Release 8)", 3GPP TS 24.301 V8.1.0, Mar. 2009, pp. 1-250.
(Continued)

*Primary Examiner* — Erica Navar
(74) *Attorney, Agent, or Firm* — McDonnell Boehnen Hulbert & Berghoff LLP (57) ABSTRACT

The invention relates to a method for establishing a communication service with a user equipment in the coverage area of a base station is disclosed. The base station is part of a telecommunication system comprising a plurality of base
(Continued)

stations connected to a core network containing a connection information database. In the method, at least one communication identifier is received by the base station of the user equipment in the coverage area of the base station after the base station has processed information indicative of a disconnection between the base station and the connection information database, e.g. a disconnection between the base station and the core network. The received at least one communication identifier is stored in a local storage associated with the base station. The communication service is established via the base station using the communication identifier from the local storage.

15 Claims, 6 Drawing Sheets

(51) Int. Cl.
  *H04W 8/30* (2009.01)
  *H04W 24/04* (2009.01)
(58) Field of Classification Search
  USPC .................................................. 455/423–425
  See application file for complete search history.

(56) References Cited

U.S. PATENT DOCUMENTS

2013/0310028 A1* 11/2013 Miyagawa .............. H04W 8/06
  455/433
2014/0051445 A1* 2/2014 Vikberg ................ H04W 36/02
  455/436

OTHER PUBLICATIONS

"3rd Generation Partnership Project: Technical Specification Group Services and System Aspects; General Packet Radio Service (GPRS); Service Description; Stage 2 (Release 8)", 3GPP TS 23.060 V8.13.0, Jun. 2011, pp. 1-281.
PCT International Search Report and Written Opinion, PCT International Application No. PCT/EP2013/076644, dated Jan. 27, 2014.
European Search Report, European Patent Application No. 12197439.8. dated Jun. 28, 2013.
EP Office Action, dated May 29, 2018.

* cited by examiner

METHOD, TELECOMMUNICATIONS NODE AND TELECOMMUNICATIONS TERMINAL

CROSS REFERENCE TO RELATED APPLICATIONS

The present application is a national stage entry of, and claims priority to, PCT/EP2013/076644, filed on Dec. 16, 2013, which claims priority to European Patent Application EP 12197439.8, filed in the European Patent Office on Dec. 17, 2012, both of which are hereby incorporated in their entirety herein by reference.

FIELD OF THE INVENTION

The invention relates to a method for establishing a communication service with a user equipment in the coverage area of a base station in a telecommunication system comprising a plurality of base stations connected to a core network containing a connection information database. The invention also relates to a telecommunications node and a telecommunications terminal for use in such a method.

BACKGROUND

During the last decade, mobile telecommunications has become the predominant form of communications and further growth is expected in the years to come. Mobile telecommunications relies on the existence of a radio network providing radio coverage by means of base stations in areas through which mobile terminals can move. The base stations are connected to a core network of the telecom provider in order to allow communication services to be established. The core network comprises several further telecommunications nodes. One such a node, e.g. a Home Location Register (HLR), a Home Subscriber System (HSS) or a domain name server (DNS), is a central database with communication identifiers that are required to establish a communication service (e.g. a voice call or a data transfer) with one or more of the mobile terminals as is known in the art. The central database is part of the core network of the network provider.

The existing 3G and 4G telecommunication standards require the availability of the communication identifiers from the central database (e.g. the HLR or the HSS) to establish a communication service with the terminals in the coverage area of the base station. If the central database is not available, a communication service cannot be established. Such a situation of unavailability of the central database communication identifiers may e.g. arise when a catastrophic event occurs (e.g. an earthquake, flooding, explosion) or due to hardware or software failures in the telecommunications system. In one particular example, the connection link between one or more base stations (that as such are still able to provide radio coverage for the terminals for one or more communication services) and the core network may be broken. In one other example, the connection link with the base station is operational, but other parts of the core network do not operate appropriately such that the central database cannot be accessed.

In emergency situations, there is a need for communication in the relevant area and if the base stations are still able to provide services, this capacity is desired to be used to provide communication services. Such services may include SMS, location information provisioning (e.g. GPS coordinates), e-mail and, if possible, voice communication. However, since the central communication identifier information database is not available, the existing standards do not allow for these communication services to be established.

SUMMARY

In view of the above, it is desirable to enable communication services with a user equipment in the coverage area of an operative base station when the central database with communication identifiers for establishing communication services with the user equipment is not available. In particular, it is desirable to enable such communication services with the user equipment when the connection link between the base station and the core network fails to operate.

To that end, a method for establishing a communication service with a user equipment in the coverage area of a base station is disclosed. The base station is part of a telecommunication system comprising a plurality of base stations connected to a core network containing a communication identifier database. In the method, at least one communication identifier is received by the base station for communicating with the user equipment in the coverage area of the base station after the base station has processed information indicative of a disconnection between the base station and the connection information database, e.g. a disconnection between the base station and the core network. The received at least one communication identifier is stored in a local storage associated with the base station. The communication service is established via the base station using the communication identifier from the local storage.

Moreover, a computer program product implemented on a computer-readable non-transitory storage medium is disclosed, wherein the computer program product is configured for, when run on a computer, to execute the method described herein.

Still further, a telecommunications node is disclosed in a telecommunication system comprising a plurality of base stations connected to a core network containing a connection information database. The telecommunications node may comprise a base station. The telecommunications node comprises a processor configured for processing information indicative of a disconnection between the telecommunications node and the connection information database, e.g. a disconnection between the base station and the core network. The telecommunications node also comprises a receiving system configured for receiving at least one communication identifier for communicating with a user equipment in a coverage area of a base station of the telecommunications system, after processing information in the telecommunications system that is indicative of a disconnection between the base station and the connection information database, e.g. a disconnection between the base station and the core network. The telecommunications node comprises a storage, associated with the telecommunications node, for storing the received communication identifier and for providing the communication identifier enabling a communication service to be established with the user equipment.

Finally, a telecommunications terminal (e.g. a user equipment UE) is disclosed that is configured for use with the telecommunications node. The terminal comprises a receiving system, a processor and a transmission system. The receiving system is configured for receiving a disconnection indication indicating a disconnection between a base station and the connection information database, e.g. a disconnection between the base station and the core network. The processor is configured for processing the disconnection indication and making available at least one communication identifier and, optionally, further emergency help relevant information, in response to receiving the disconnection indication. The transmission system is configured for transmitting the at least one communication identifier and, optionally, the further information.

By providing a local database associated with a telecommunications node, such as a base station, wherein the local database contains at least one communication identifier of the user equipment, the base station that has access to the local storage can access the communication identifier (and, possibly, information associated with that communication identifier) when needed to establish a communication service associated with that communication identifier without requiring access to the central database. The base station or base stations are able to provide an operative radio network in an isolated mode. In other words, when for some reason, a connection with the central database cannot be made, wireless communication services can still be provided through the base station having access to the local storage with regard to user equipment for which one or more communication identifiers are stored in the local storage. When the connection between the base station and the core network is not operative, the local storage provides a means to emulate (part of) the functionality of the core network.

Typical examples of communication identifiers include identifiers for voice communication services and/or data communication services. These identifiers are user-level communication identifiers, i.e. identifiers that users typically use to establish a communication service with a user equipment. For example, the communication identifier(s) may include an MSISDN of a user equipment for voice communication services and SMS services, a SIPURI for SIP communication services, a web address (URL) for internet services, an e-mail address for e-mail services, etc.

It should be noted that the storage of the communication identifiers may be caused in response to processing the information indicative of the disconnection. A local database may be generated as a result of this information. Alternatively, an existing local database may be filled with the communication identifier(s) obtained from communication between the user equipment and the core network before detection of the disconnection.

It should be appreciated that further core network functionality may also be provided at the base station. One example of such functionality is the issuing of IP addresses for user equipment wanting to establish a PDP context activation procedure as defined in TS 23.060.

Preferably, each base station has its own local storage to optimize the chance that an operative base station can access the local storage. The local storages of separate base stations may exchange information e.g. by synchronisation. This may occur, for example, when a collection of base stations is still operative and information exchange (wired or wireless) is possible between the base stations. However, in some cases, multiple base stations may share a local storage. This shared local storage may reside in either a single or in multiple base stations.

It should also be appreciated that the information indicative of a disconnection between the base station and the central communication information database may be received from an external system informing the telecommunications node, e.g. the base station(s), of the disconnection. However, in an embodiment of the invention, the information indicative of the disconnection is obtained by the base station detecting the disconnection between the base station and the core network. This embodiment enables detecting the disconnection by the base station without having to rely on external system(s) that may be damaged or dysfunctional.

Information indicative of a disconnection may comprise the absence of information that would be received in case of an operative connection. For example, the base station may detect the absence of acknowledgements on messages sent to the core network. In that case, the absence of the acknowledgement(s) indicates the disconnection with the core network.

It should also be appreciated that the UE, after having received the disconnection indication, may skip or adapt certain parts of the procedure wherein it normally transmits user data or control data. For example, the UE may omit applying encryption to at least part of the data transmitted to the base station, such as the communication identifiers and/or the further information as mentioned below. As a result, the base station receiving the data can simply store the data in the local storage and the stored data is readily accessible for use by e.g. emergency workers.

The establishment of the communication service using the locally stored communication identifiers involves looking up the communication identifier in the local database. Information associated with the communication identifier may also be retrieved from the local storage, e.g. location information (especially useful when multiple base stations are still operative) and/or lower level parameters for the user equipment such as IMSI or TIMSI. This information may then be applied to set up the communication service with the user equipment.

An embodiment of the disclosed method comprises transmitting a disconnection indication from the base station to the user equipment in response to the information indicative of the disconnection and receiving the at least one communication identifier in response to transmitting the disconnection indication. The disconnection indication triggers the user equipment to transmit one or more of the communication identifiers to the base station that would normally not be transmitted to the base station, such as the MSISDN, the SIP URI and/or the e-mail address.

The disconnection indication may be transmitted from the base station in response to receiving an attach request at the base station from the user equipment. User equipment typically attempts to attach to the network when switched on or as a result of expiry of a timer triggering a re-attach.

In order to receive the communication identifier(s) more quickly at the base station, the disconnection indication may be initiated from the network without waiting for an attach request. The disconnection indication may e.g. be triggered at the network side as a result of receiving or detecting the information indicative of the disconnection between the base station and the central connection information database, e.g. a disconnection between the base station and the core network. One example of a disconnection indication triggered at the network side may be the inclusion of the disconnection indication in the system information that is broadcast in the cell of the base station. Alternatively, another signalling message may be used for the purpose. In response to the network side initiated disconnection indication, the user equipment may transmit the communication identifier to the base station, e.g. in an adapted re-attach procedure.

In a further embodiment of the method, further information may be received from the user equipment at the base station and stored in the local storage. The further information may comprise emergency help relevant information. This information may include information about the location of the user equipment (e.g. GPS coordinates measured by the terminal) or information about the battery status of the user equipment. The former information can be used to localize users of the user equipment, whereas the latter can be used to evaluate which user equipment to contact first before the battery is dead.

In order to be able to start establishing communication with user equipment as quickly as possible, an advantageous embodiment of the method includes the step that, prior to receiving information indicative of a disconnection between the base station and the connection information database, communication identifiers from one or more of the further user equipment are already stored in the local storage. This may be done in particular for non-encrypted identifiers that pass the base station. After having processed the information indicative of a disconnection between the base station and the connection information database, the communication service can be established via the base station with the further user equipment using the communication identifier stored in the local storage for the further user equipment. This embodiment presumes that at least part of the content of the local database of a time interval prior to the disconnection may still be valid after the disconnection by the base station.

It is noted that the invention relates to all possible combinations of features recited in the claims. Thus, all features and advantages of the first aspect likewise apply to the second and third aspects, respectively.

BRIEF DESCRIPTION OF THE DRAWINGS

Aspects of the invention will be explained in greater detail by reference to exemplary embodiments shown in the drawings, in which.

DETAILED DESCRIPTION

Figure 1:
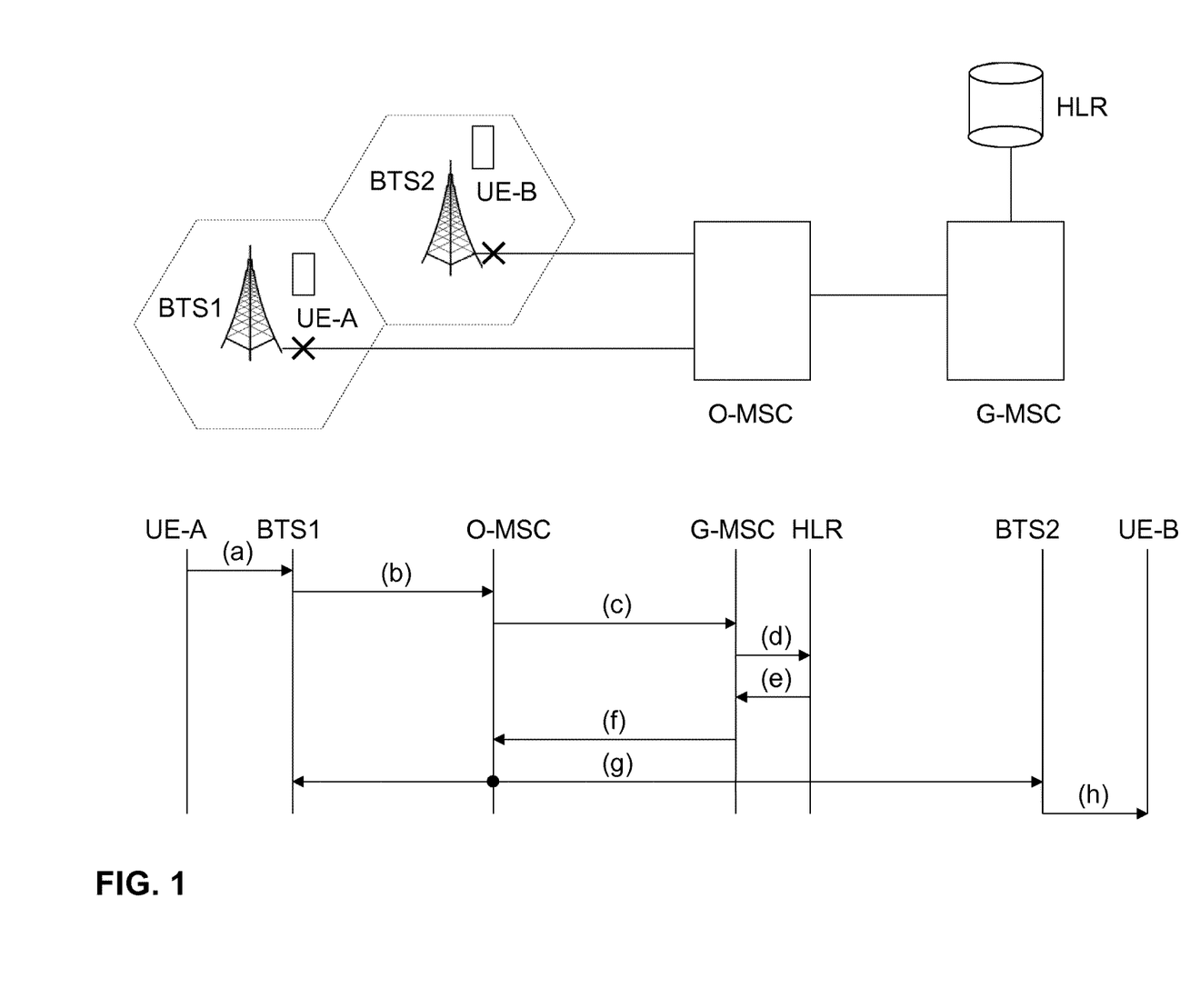
FIG. 1 depicts a simplified prior art telecommunications system and a time diagram illustrating a few basic steps of establishing a communication service with a user equipment in the prior art telecommunications system.

FIG. 1 depicts a portion of a simplified prior art telecommunications system and a time diagram illustrating a few basic steps of establishing a communication service between a user equipment UE-A and a user equipment UE-B in this telecommunications system. The portion of the illustrated simplified telecommunications system comprises a first base station BTS1 defining a cell providing radio coverage for UE-A and a second base station BTS2 defining a second cell providing radio coverage for UE-B. Both base stations BTS1 and BTS2 are drawn to be associated with a common mobile switching centre O-MSC (intermediary nodes, such as a base station controller BSC, are not shown). Furthermore, a gateway mobile switching centre (G-MSC) is shown that has access to a home location register HLR.

Whereas FIG. 1 illustrates a 2G circuit switched telecommunications system (e.g. GSM), it should be appreciated that other generations of telecommunications systems comprise similar core networks. For example, in 3G packet switched systems, a node SGSN is provided (corresponding to the O-MSC in FIG. 1) and a node GGSN is provided (corresponding to the G-MSC in FIG. 1) that is connected to a HLR. In IMS, a S-CSCF has a similar function as the O-MSC, and the I-CSCF has a similar function as the G-MSC. Also, 4G-LTE systems comprise similar entities such as mobility management entities MME and a home subscriber system HSS. In internet communication using IP addresses, a DNS performs a role similar to the HSS to translate a URL into an IP address.

The time diagram illustrates the situation wherein the network establishes a communication service (e.g. a voice call or an SMS message transfer) between user equipment UE-A and user equipment UE-B. It is noted that in the 2G system standards, the user equipment may also be referred to as mobile station MS.

In a first step (a), a call setup message is transmitted by UE-A comprising at least the telephone number MSISDN of UE-B as the communication identifier. The call setup message is received by base station BTS1 and forwarded to the originating MSC (O-MSC) in step (b). The O-MSC searches for the gateway MSC (G-MSC) of the network operator of the subscriber of UE-B on the basis of the MSISDN received in step (b). Then, in a next step (c), the call setup message is forwarded to the appropriate G-MSC. The G-MSC consults the home location register (HLR) associated with the G-MSC to find the location of UE-B in step (d) using the MSISDN of UE-B as the key. In the depicted situation, the HLR will inform the G-MSC that UE-B is also in the area of O-MSC in step (e) and the G-MSC will subsequently inform the O-MSC accordingly in step (f). O-MSC will instruct the base stations BTS1 and BTS2 to transmit a paging signal for UE-B in step (g) and in step (h) the receipt of the paging signal is illustrated. A communications service may now be established between UE-A and UE-B. For example, UE-B may attach to the network in response to receiving the paging signal of step (h) in order to subsequently receive an SMS message.

As explained above, in order to establish a communication service between UE-A and UE-B in prior art telecommunications systems, the central connection information database HLR is consulted in order to locate the user equipment UE-B. Obviously, if the central database cannot be accessed (e.g. due to an external event, such as an earthquake or an explosion or due to hardware/software failure), the communications service cannot be established. Access of the central database HLR may e.g. fail as a result of a broken connection between the BTS's 1 and 2 and the core network, as indicated by the crosses in FIG. 1. It should be appreciated, however, that alternatively the connection with the central database may also be broken elsewhere in the network.

Figure 2A:
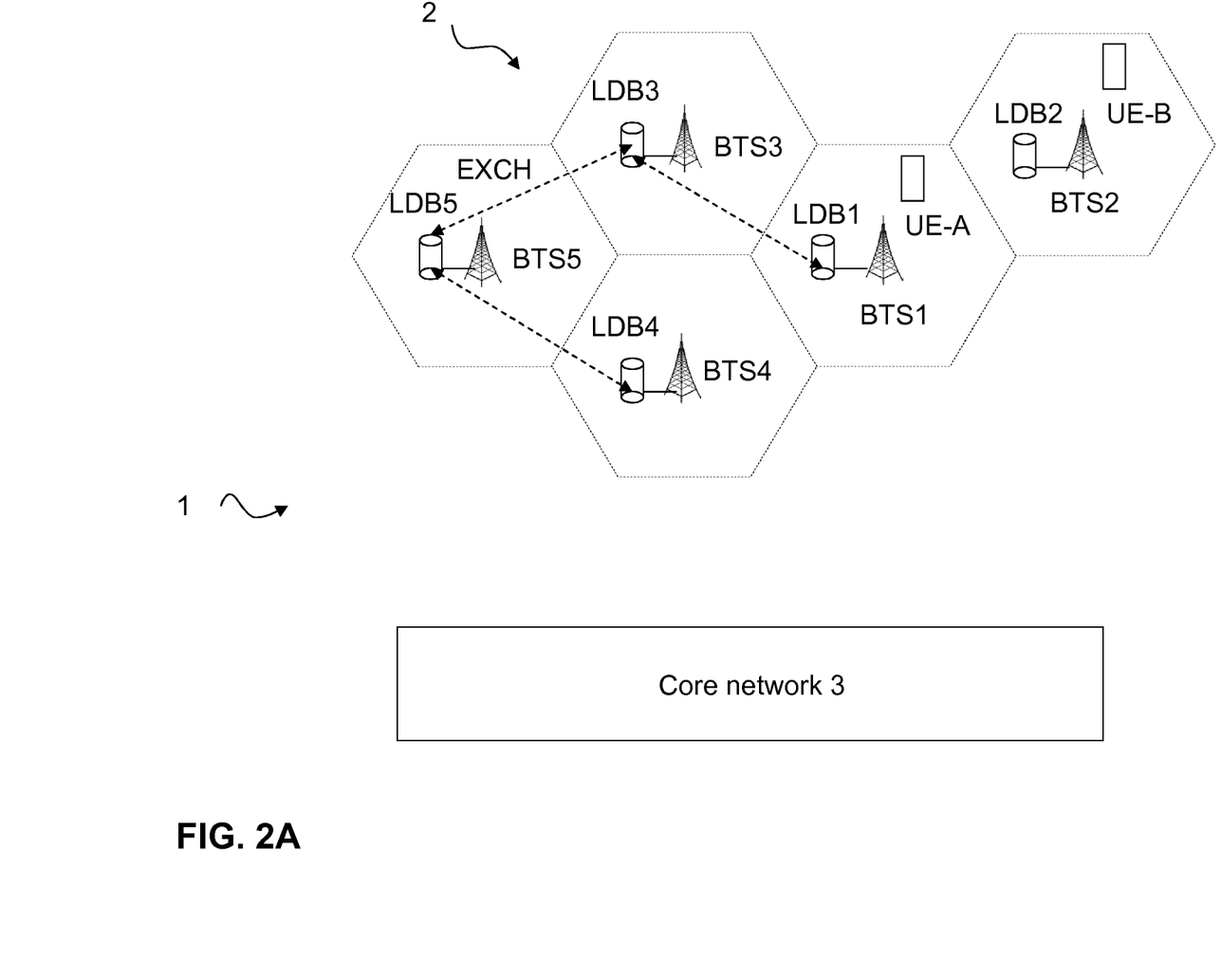
FIGS. 2A and 2B are schematic illustrations of a telecommunications system containing a radio network and a core network according to an embodiment of the invention.
Figure 2B:
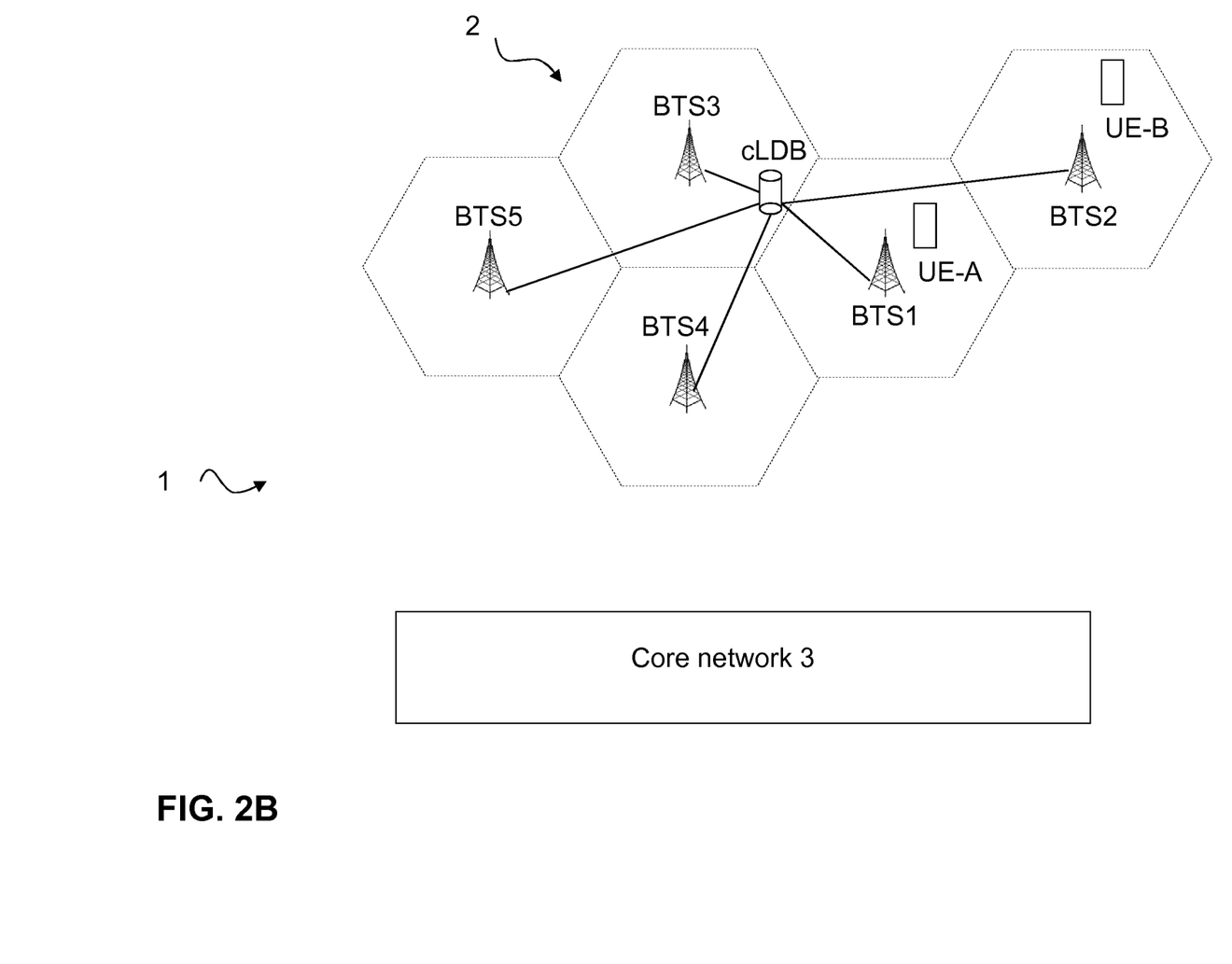

FIGS. 2A and 2B are schematic illustrations of a 2G, 3G or 4G telecommunications system 1 containing a radio network 2 and a core network 3 according to an embodiment of the invention. As illustrated in the figures, the base stations BTS are isolated from the core network 3.

Basically, in the telecommunications system 1, each of the base stations BTS is associated with a local database LDB storing communication identifiers of user equipment UE in their cells. It should be appreciated that the base stations are referred to as NodeB's in 3G telecommunications systems and as eNodeB's in 4G telecommunications systems. Preferably, each base station has its own local database LDB, as shown in FIG. 2A. The local databases LDB of the respective base stations BTS may exchange information, e.g. parts or all of the information stored, if possible, as shown by the dashed double arrow EXCH in FIG. 2A. This may occur, for example, when a collection of base stations is still operative and information exchange (wired or wireless) is possible between the base stations. Alternatively, two or more base stations BTS share a common local database cLDB, as illustrated in FIG. 2B.

Figure 3A:
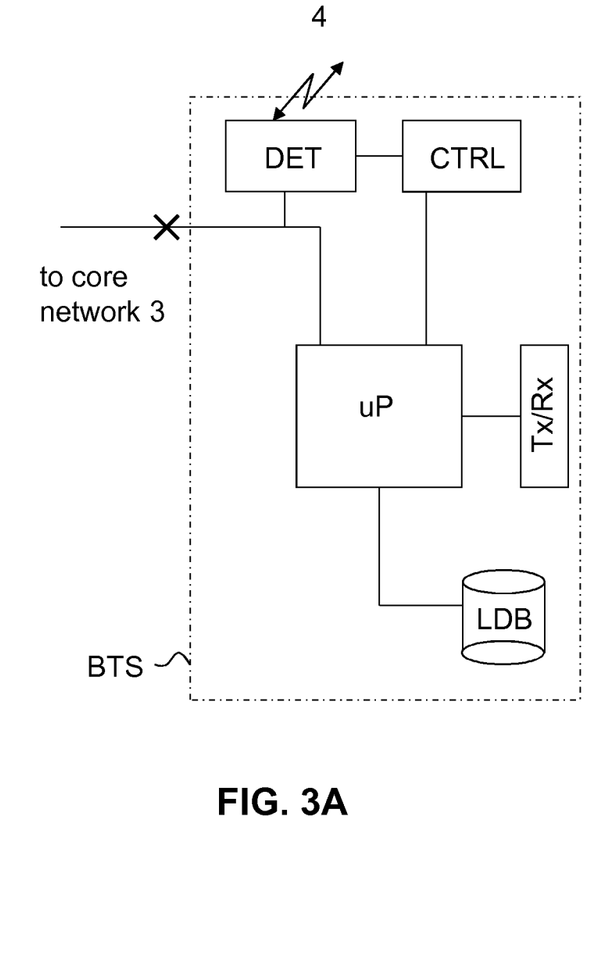
FIGS. 3A and 3B are block diagrams of a telecommunications node, e.g. a base station, and a user equipment, respectively, for use in the telecommunications system according to an embodiment of the invention.
Figure 3B:
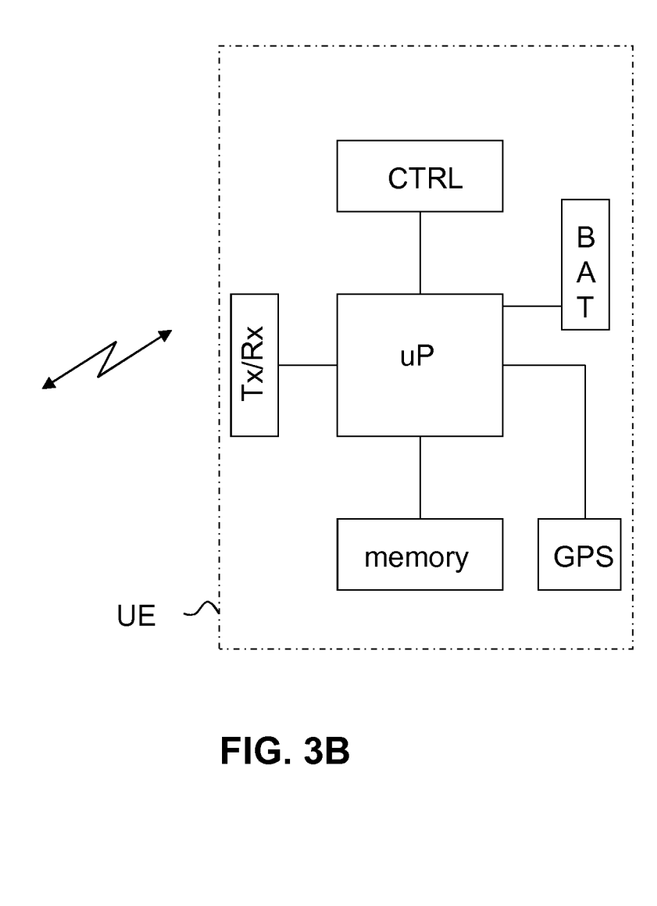

FIGS. 3A and 3B are block diagrams of a telecommunications node, e.g. a base station BTS, and a user equipment UE, respectively, for use in the telecommunications system 1 of FIG. 2A according to an embodiment of the invention. In the block diagrams, some components for performing the disclosed method are schematically illustrated. It should be noted that these components may be implemented in hardware, software or in a hybrid fashion. The telecommunications node BTS and the user equipment UE at least contain a processor uP for executing actions, a controller CTRL for controlling actions by the processor uP and one or more forms of storage (not shown) for storing computer programs and (intermediate) processing results.

The base station BTS furthermore comprises a transceiver Tx/Rx for radio communication with user equipment UE in the cell of the base station BTS.

Moreover, the base station BTS contains the associated local database LDB for storing communication identifiers.

The base station BTS also contains a detector DET for monitoring the connection with the core network 3. Detector DET may e.g. detect the absence of acknowledgements normally received from the core network. Detector DET is connected to controller CTRL in order to signal a broken connection with the core network 3 as indicated by the cross in FIG. 3A. Controller 3 may then instruct the processor uP to perform the appropriate actions as will be discussed in more detail with reference to FIGS. 4A and 4B. It should be noted that, instead of monitoring the connection with the core network, detector 3 may also provide an interface, possibly a radio interface 4, to an external system that can alert the base station BTS of the dysfunctional core network or of the unavailability of the central database HLR.

FIG. 3B is schematic illustration of a user equipment UE. The UE comprises a transceiver Tx/Rx for communication over the radio interface with the base station BTS of FIG. 3A. The UE comprises a battery BAT for power.

The UE comprises a memory storing communication identifiers, such as the MSISDN of the UE, an e-mail address of an e-mail account available via the UE, a SIP URI for SIP data sessions with the UE etc.

The UE also contains a GPS module for determining location coordinates of the UE.

Figure 4A:
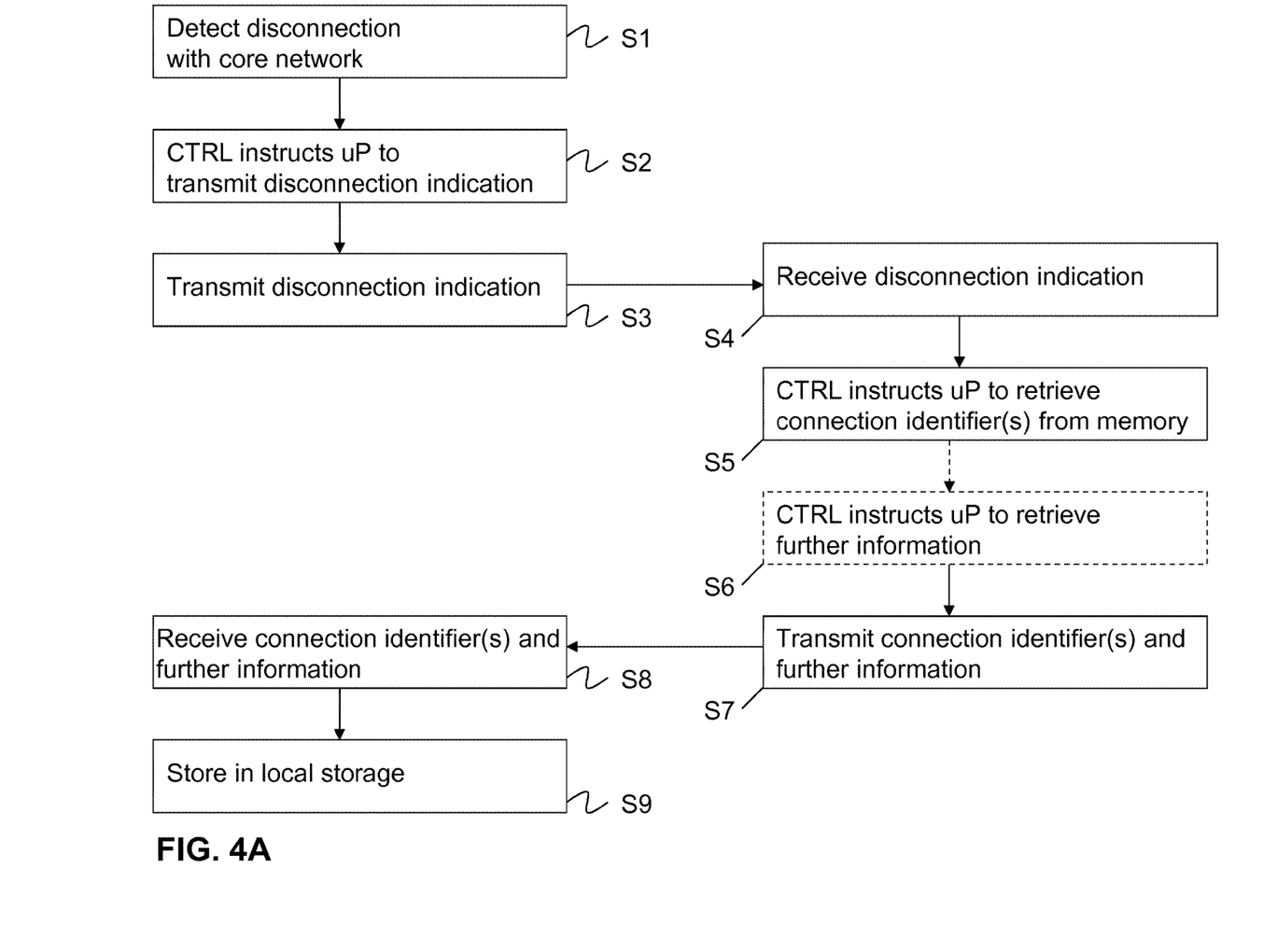
FIGS. 4A and 4B are flow charts for a method of using the telecommunications node and the user equipment of FIGS. 3A and 3B, respectively.

An embodiment of operating a base station BTS and a user equipment UE in the telecommunications system of FIG. 2A. will now be described in more detail with reference to FIG. 4A. FIG. 4A is a flow chart for a method of using the base station BTS and the user equipment UE of FIGS. 3A and 3B.

FIG. 4A illustrates an embodiment of a base station initiated disconnection indication.

In a first step S1, the detector DET of the base station BTS detects a disconnection with the core network 3. In response to detecting the disconnection, this disconnection information is processed by issuing an instruction in step S2 from controller CTRL to processor uP to transmit a disconnection indication in the cell of the base station BTS. In step S3, base station BTS transmits the disconnection indication in the cell. The base station BTS may e.g. set an emergency operation bit in the broadcast system information block or transmit another signalling message. In step S4, the user equipment UE receives the disconnection indication. The disconnection indication forces the user equipment UE to retrieve one or more communication identifiers from the memory under the control of controller CTRL of the UE in step S5. For example, reading the emergency operation bit in the system information block on the broadcast channel (or another signalling message on another channel) by the UE, triggers the UE to cooperate in a new attach procedure and to provide its communication identifier(s) to the base station. Optionally, in step S6, the disconnection indication may also trigger retrieval of further information, e.g. emergency help relevant information, such as location coordinates provided by a the GPS module and/or the battery status of the battery BAT. For example, the emergency bit may trigger transmitting the GPS position of the UE, information about the battery status, etc. Also, interaction with the user of the UE can be triggered, e.g. by requesting manual input on e.g. the health status of the user and/or other people.

The transmission of the disconnection indication could also force calls originating from UE's in the cell to be routed to a predetermined termination point, e.g. local rescue workers.

In step S7, the communication identifier(s) and, optionally, the further information, is transmitted from the UE to the base station BTS in response to receiving the disconnection indication and is received at the base station BTS in step S8.

In step S9, the communication identifiers and, optionally, the further information, is stored in the local database LDB associated with the base station BTS.

Figure 4B:
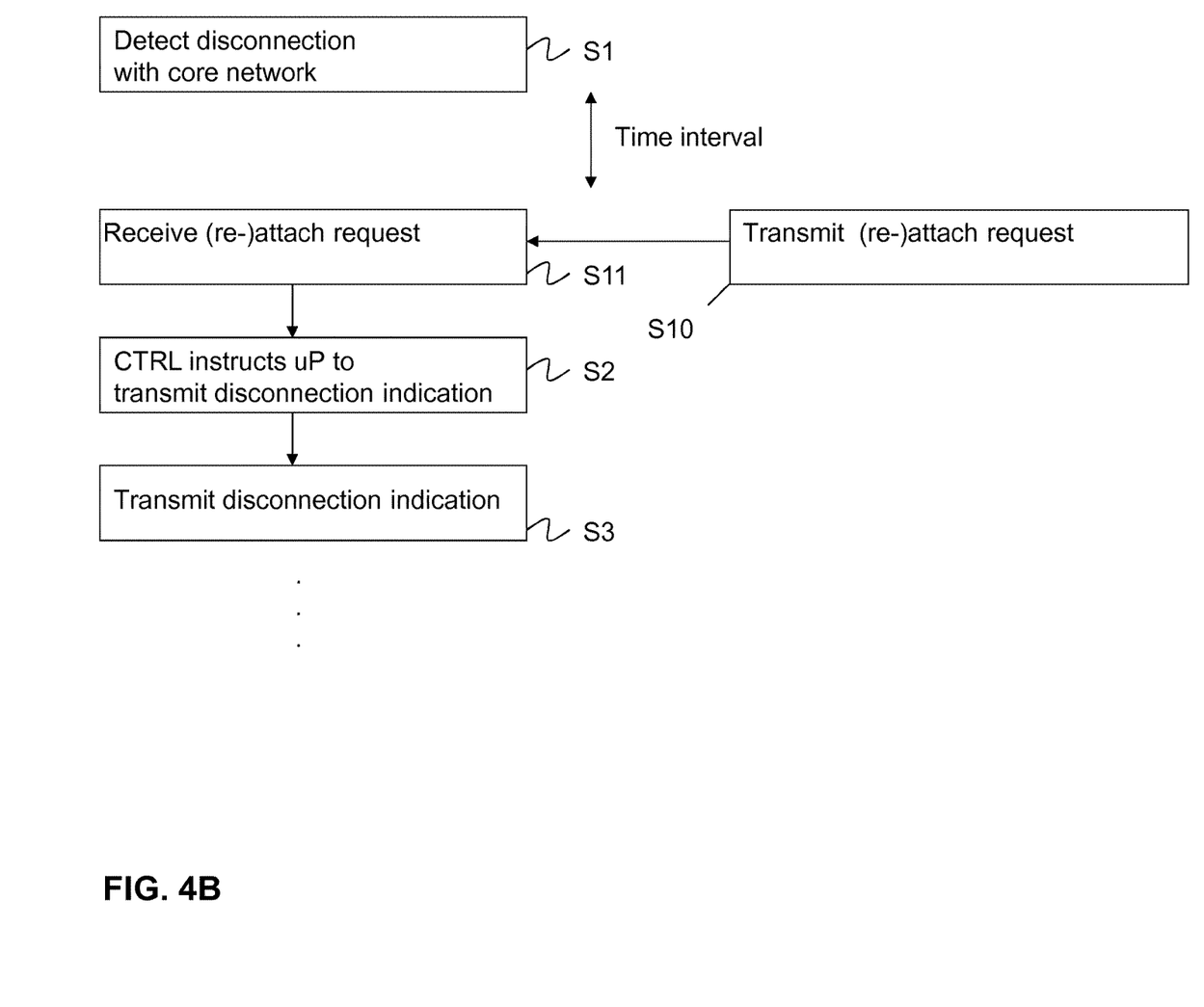

FIG. 4B is flow chart of an alternative embodiment, wherein the transmission of the disconnection indication is triggered from the side of the user equipment UE.

Again, in a first step S1, the detector DET detects a disconnection of the base station BTS with the core network 3.

A user equipment may periodically send a re-attach request to the telecommunications network 1, e.g. as a periodic location area update as specified in 3GPP TS 24.301. The UE may also send an attach request after being switched on. The UE typically sends a re-attach request after expiry of a timer. Step S10 represents the transmission of an attach or re-attach message from the user equipment UE. In step S11, the attach or re-attach message is received at the base station BTS. The time interval between time at which the disconnection is detected and the receipt of the attach or re-attach request depends e.g. on the expiry of the timer and may be different for different UE's in the network.

After receiving the attach request, the controller in the base station BTS instructs the processor to transmit a disconnection indication in step S2 followed by the actual transmission of the disconnection indication in step S3. The remainder of the method follows steps S4-S9 as indicated in FIG. 4A.

In the case of using a regular, periodic attach update procedure, upon reception of the attach request in step S11, the base station BTS may e.g. respond with an error code or set a disconnection flag, e.g. an emergency mode operation flag. By interpretation of the error code or disconnection flag, the UE is then instructed to follow a disconnected state procedure, e.g. for emergency operation. Hence, the UE would respond by sending the communication identifier(s) and, optionally, the further information. The communication identifier and further information may then be stored in the local database LDB of the base station BTS.

After storage of the connection identifier in the local database LDB of the base station, the primary means for establishing the communication service with the user equipment in the cell of the base station is available. Further information, not relevant to the invention, may be needed to establish the communication service. As an example, the user equipment may set up an IP connection, wherein the user equipment obtains an IP address from the base station. The local database may have stored the relation between the communication identifier and the assigned IP address, such that the base station has information which IP connection should be used for which communication identifier. In another example, the local storage stores the location of the UE, e.g. in which cell(s) the UE is. After receiving a communication request for a particular communication identifier (e.g. an MSISDN), a paging message is transmitted in the cells where the UE is known to be according to the information in the local database. The local database LDB may then also store temporary identifiers of the UE assigned when the UE was attached to the network.

In the preceding description, it has been assumed that the local database LDB at the telecommunications node was empty and was filled after detection of the disconnection by procedures described with reference to FIGS. 4A and 4B. However, it may be useful to intercept one or more communication identifiers and, optionally, further information prior to detecting the disconnection, such that the local database is already filled with the one or more communication identifiers and, possibly, the further information. This embodiment provides for a quick start of filling the local database LDB with communication identifiers after the detection of the disconnection. At least some of the communication identifiers of UE's may still be relevant after the detection of the disconnection. The communication identifier(s) and/or further information preferably only relate to non-encrypted identifiers and information, since decryption keys will normally not be available at the base station BTS.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

With some modifications, one skilled in the art may extend the embodiments described herein to other architectures, networks, or technologies.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A method for establishing a communication service with a user equipment (UE) in a coverage area of a base station in a telecommunication system comprising a plurality of base stations connected to a core network containing a connection information database, wherein the connection information database comprises identifiers identifying the user equipment, the method comprising:
the base station detecting disconnection between the base station and the core network, the disconnection preventing the base station from communicating with the connection information database in the core network;
the base station broadcasting a disconnection indication in the coverage area of the base station in response to processing information indicative of the disconnection;
the base station receiving from the UE at least one communication identifier identifying the UE and enabling directly communicating with the UE in the coverage area of the base station when the base station is disconnected from the core network;
the base station storing the received communication identifier in a local connection information database at the base station; and
the base station establishing the communication service with the user equipment using the communication identifier from the local connection information database instead of from the connection information database in the core network when the base station is disconnected from the core network.

2. The method according to claim 1, wherein receiving the at least one communication identifier comprises:
receiving the at least one communication identifier in response to broadcasting the disconnection indication.

3. The method according to claim 2, wherein receiving the at least one communication identifier further comprises:
receiving an attach request at the base station from the user equipment; and
broadcasting the disconnection indication in response to receiving the attach request.

4. The method according to claim 2, wherein the disconnection indication is a base station initiated disconnection indication.

5. The method according to claim 1, further comprising:
receiving further information from the user equipment at the base station, the further information comprising emergency help relevant information; and
storing the further information in the local connection information database.

6. The method according to claim 1, wherein the coverage area of the base station comprises further user equipment, and wherein the method further comprises:
prior to detecting disconnection, storing communication identifiers from one or more of the further user equipment in the local connection information database; and
after detecting disconnection, establishing the communication service via the base station with the further user equipment using the communication identifier stored in the local connection information database for the further user equipment.

7. The method according to claim 1, further comprising exchanging information between the local connection information database and a further local connection information database of a further base station of the telecommunication system.

8. A non-transitory computer-readable medium having instructions stored thereon that, when executed by one or more processors of a telecommunication system comprising a plurality of base stations connected to a core network containing a connection information database, wherein the connection information database comprises identifiers identifying the user equipment, cause the telecommunication system to carry out operations including:
    detecting by the base station disconnection between the base station and the core network, the disconnection preventing the base station from communicating with the connection information database in the core network;
    broadcasting by the base station of a disconnection indication in the coverage area of the base station in response to processing information indicative of the disconnection;
    receiving by the base station from a user equipment at least one communication identifier identifying the UE and enabling directly communicating with the user equipment in a coverage area of a base station of the telecommunication system when the base station is disconnected from the core network;
    storing by the base station the received communication identifier in a local connection information database at the base station; and
    establishing by the base station a communication service with the user equipment using the communication identifier from the local connection information database instead of from the connection information database in the core network when the base station is disconnected from the core network.

9. A telecommunications node in a telecommunication system, the telecommunications system comprising a plurality of base stations connected to a core network containing a connection information database, wherein the connection information database comprises communication identifiers identifying user equipment (UEs) operating in coverage areas of the base stations, the telecommunications node comprising:
    a detector configured for detecting a disconnection between the telecommunications node and the core network, the disconnection preventing the base station from communicating with the connection information database in the core network;
    a processor configured for processing information indicative of a disconnection between the telecommunications node and the core network, and for causing the telecommunication node to broadcast a disconnection indication in a coverage area of a base station of the telecommunications system in response to processing the information indicative of the disconnection;
    a receiving system configured for receiving at least one communication identifier identifying the UE and enabling directly communicating with a user equipment in the coverage area of the base station of the telecommunications system when the base station is disconnected from the core network; and
    a local connection information database, at the telecommunications node, for storing the received communication identifier and for providing the communication identifier enabling a communication service to be established with the user equipment, the local connection information database being used instead of the connection information database in the core network when the base station is disconnected from the core network.

10. The telecommunications node according to claim 9, wherein the receiving system is configured for receiving the at least one communication identifier in response to broadcasting the disconnection indication.

11. The telecommunications node according to claim 10, wherein the system is configured for broadcasting the disconnection information by at least one of:
    receiving an attach request from the user equipment and broadcasting the disconnection indication from the base station to the user station in the coverage area in response to receiving the attach request, or
    initiating broadcasting the disconnection indication from the base station to the user equipment in the coverage area.

12. The telecommunications node according to claim 9, wherein the local connection information database is further configured for storing further information.

13. The telecommunications node according to claim 9, wherein the coverage area of the base station comprises further user equipment, and wherein the telecommunications node is further configured for:
    prior to receiving information indicative of a disconnection between the base station and the connection information database, storing communication identifiers from one or more of the further user equipment in the local connection information database; and
    after having received the information indicative of a disconnection between the base station and the core network, providing a communication identifier for a further user equipment enabling a communication service with the further user equipment using the communication identifier stored in the local connection information database for the further user equipment.

14. The telecommunications node according to claim 9, wherein the telecommunications node is arranged for exchanging information between the local connection information database and a further local connection information database of a further node of the telecommunication system.

15. A telecommunications terminal configured for use with a telecommunications node of a telecommunication system comprising a plurality of base stations connected to a core network containing a connection information database, wherein the connection information database comprises identifiers identifying the user equipment, the telecommunications terminal comprising:
    a receiving system configured for receiving a disconnection indication indicating a disconnection between a base station of the telecommunication system and the core network, the disconnection preventing the base station from communicating with the connection information database in the core network;
    a processor configured for processing the disconnection indication and making available at least one communication identifier in response to receiving the disconnection indication; and
    a transmission system configured for transmitting the at least one communication identifier to the base station for storage in a local connection information database at the base station and for enabling establishment of a communication service via the base station using the local connection information database instead the connection information database in the core network when the base station is disconnected from the core network.

\* \* \* \* \*